(12) United States Patent
Ramachandran et al.

(10) Patent No.: US 11,481,636 B2
(45) Date of Patent: Oct. 25, 2022

(54) SYSTEMS AND METHODS FOR OUT-OF-DISTRIBUTION CLASSIFICATION

(71) Applicant: salesforce.com, inc., San Francisco, CA (US)

(72) Inventors: Govardana Sachithanandam Ramachandran, Palo Alto, CA (US); Ka Chun Au, Milbrae, CA (US); Shashank Harinath, San Francisco, CA (US); Wenhao Liu, Redwood City, CA (US); Alexis Roos, Los Angeles, CA (US); Caiming Xiong, Menlo Park, CA (US)

(73) Assignee: Salesforce.com, Inc., San Francisco, CA (US)

( * ) Notice: Subject to any disclaimer, the term of this patent is extended or adjusted under 35 U.S.C. 154(b) by 337 days.

(21) Appl. No.: 16/877,325

(22) Filed: May 18, 2020

(65) Prior Publication Data

US 2021/0150365 A1 May 20, 2021

Related U.S. Application Data

(60) Provisional application No. 62/968,959, filed on Jan. 31, 2020, provisional application No. 62/937,079, filed on Nov. 18, 2019.

(51) Int. Cl.
*G06N 3/08* (2006.01)
*G06N 20/00* (2019.01)
(Continued)

(52) U.S. Cl.
CPC ............. *G06N 3/084* (2013.01); *G06F 17/18* (2013.01); *G06K 9/628* (2013.01); *G06K 9/6228* (2013.01);
(Continued)

(58) Field of Classification Search
CPC .......... G06N 2/08; G16H 50/50; G10L 15/20; G10L 15/16
See application file for complete search history.

(56) References Cited

U.S. PATENT DOCUMENTS 6,353,815 B1 * 3/2002 Vilim ................. G05B 23/0254
706/15
6,553,357 B2 * 4/2003 Mathias ................. G06N 3/086
706/15
(Continued)

*Primary Examiner* — Yosef Kassa
(74) *Attorney, Agent, or Firm* — Haynes and Boone, LLP

(57) ABSTRACT

An embodiment provided herein preprocesses the input samples to the classification neural network, e.g., by adding Gaussian noise to word/sentence representations to make the function of the neural network satisfy Lipschitz property such that a small change in the input does not cause much change to the output if the input sample is in-distribution. Method to induce properties in the feature representation of neural network such that for out-of-distribution examples the feature representation magnitude is either close to zero or the feature representation is orthogonal to all class representations. Method to generate examples that are structurally similar to in-domain and semantically out-of domain for use in out-of-domain classification training. Method to prune feature representation dimension to mitigate long tail error of unused dimension in out-of-domain classification. Using these techniques, the accuracy of both in-domain and out-of-distribution identification can be improved.

20 Claims, 12 Drawing Sheets

(51) Int. Cl.
    *G06K 9/62*     (2022.01)
    *G06N 20/10*     (2019.01)
    *G06F 17/18*     (2006.01)
    *G06V 10/75*     (2022.01)

(52) U.S. Cl.
    CPC ......... *G06K 9/6249* (2013.01); *G06K 9/6277* (2013.01); *G06N 3/082* (2013.01); *G06N 20/00* (2019.01); *G06N 20/10* (2019.01); *G06V 10/751* (2022.01)

(56) References Cited

U.S. PATENT DOCUMENTS

| | | | |
|---|---|---|---|
| 6,611,823 B1 * | 8/2003 | Selmic | G05B 13/027 706/14 |
| 8,199,999 B2 * | 6/2012 | Hoyt | G01N 1/30 382/133 |
| 8,880,450 B2 * | 11/2014 | Dobson | G06N 3/08 706/45 |
| 9,129,218 B1 * | 9/2015 | Commons | G06N 3/08 |
| 10,282,663 B2 | 5/2019 | Socher et al. | |
| 10,346,721 B2 | 7/2019 | Albright et al. | |
| 10,353,905 B2 | 7/2019 | Ramachandran et al. | |
| 10,354,264 B2 | 7/2019 | Jagota et al. | |
| 10,542,270 B2 | 1/2020 | Zhou et al. | |
| 10,546,217 B2 | 1/2020 | Albright et al. | |
| 10,558,750 B2 | 2/2020 | Lu et al. | |
| 10,565,305 B2 | 2/2020 | Lu et al. | |
| 10,565,306 B2 | 2/2020 | Lu et al. | |
| 10,565,493 B2 | 2/2020 | Merity et al. | |
| 10,573,295 B2 | 2/2020 | Zhou et al. | |
| 10,592,767 B2 | 3/2020 | Trott et al. | |
| 10,614,393 B2 | 4/2020 | Jagota et al. | |
| 10,699,060 B2 | 6/2020 | Mccann et al. | |
| 10,747,761 B2 | 8/2020 | Zhong et al. | |
| 10,776,581 B2 | 9/2020 | Mccann et al. | |
| 10,783,875 B2 | 9/2020 | Hosseini-Asl et al. | |
| 2016/0140355 A1 | 5/2016 | Jagota et al. | |
| 2016/0350653 A1 | 12/2016 | Socher et al. | |
| 2017/0024645 A1 | 1/2017 | Socher et al. | |
| 2017/0060919 A1 | 3/2017 | Ramachandran et al. | |
| 2018/0121787 A1 | 5/2018 | Hashimoto et al. | |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0336453 A1 | 11/2018 | Merity et al. | |
| 2018/0373682 A1 | 12/2018 | Mccann et al. | |
| 2018/0373987 A1 | 12/2018 | Zhang et al. | |
| 2019/0130248 A1 | 5/2019 | Zhong et al. | |
| 2019/0130312 A1 | 5/2019 | Xiong et al. | |
| 2019/0130896 A1 | 5/2019 | Zhou et al. | |
| 2019/0138653 A1 | 5/2019 | Roller et al. | |
| 2019/0140995 A1 | 5/2019 | Roller et al. | |
| 2019/0213482 A1 | 7/2019 | Socher et al. | |
| 2019/0251431 A1 | 8/2019 | Keskar et al. | |
| 2019/0258714 A1 | 8/2019 | Zhong et al. | |
| 2019/0258939 A1 | 8/2019 | Min et al. | |
| 2019/0272335 A1 | 9/2019 | Liu et al. | |
| 2019/0286073 A1 | 9/2019 | Hosseini-Asl et al. | |
| 2019/0286832 A1 | 9/2019 | Szeto et al. | |
| 2019/0355270 A1 | 11/2019 | Mccann et al. | |
| 2019/0362020 A1 | 11/2019 | Paulus et al. | |
| 2019/0362246 A1 | 11/2019 | Lin et al. | |
| 2020/0005765 A1 | 1/2020 | Zhou et al. | |
| 2020/0057805 A1 | 2/2020 | Lu et al. | |
| 2020/0065651 A1 | 2/2020 | Merity et al. | |
| 2020/0084465 A1 | 3/2020 | Zhou et al. | |
| 2020/0089757 A1 | 3/2020 | Machado et al. | |
| 2020/0090033 A1 | 3/2020 | Ramachandran et al. | |
| 2020/0090034 A1 | 3/2020 | Ramachandran et al. | |
| 2020/0103911 A1 | 4/2020 | Ma et al. | |
| 2020/0104643 A1 | 4/2020 | Hu et al. | |
| 2020/0104699 A1 | 4/2020 | Zhou et al. | |
| 2020/0105272 A1 | 4/2020 | Wu et al. | |
| 2020/0117854 A1 | 4/2020 | Lu et al. | |
| 2020/0153765 A1 | 5/2020 | Burbank et al. | |
| 2020/0153934 A1 | 5/2020 | Burbank et al. | |
| 2020/0175305 A1 | 6/2020 | Trott et al. | |
| 2020/0184020 A1 | 6/2020 | Hashimoto et al. | |
| 2020/0272940 A1 | 8/2020 | Sun et al. | |
| 2020/0285705 A1 | 9/2020 | Zheng et al. | |
| 2020/0285993 A1 | 9/2020 | Liu et al. | |
| 2020/0301925 A1 | 9/2020 | Zhong et al. | |
| 2020/0302178 A1 | 9/2020 | Gao et al. | |
| 2020/0302236 A1 | 9/2020 | Gao et al. | |

\* cited by examiner

Label : Keynote Agenda

| | word | tfid prob | id prob | comb prob |
|---|---|---|---|---|
| 0 | when | 0.10833757429152711 | 0.17666276 | 0.16188370603670205 |
| 1 | is | 0.0 | 0.21626382 | 0.0 |
| 2 | the | 0.0 | 0.0 | 0.0 |
| 3 | seminar | 0.07119309190613361 | 0.2172412 | 0.13081545860721677 |
| 4 | for | 0.00912115849561039 | 0.07351509 | 0.00567159941107313 |
| 5 | developers | 0.76242059630224388 | 0.09457094 | 0.60986170081194142 |
| 6 | keynote | 0.04892757900447445 | 0.22174627 | 0.09176753133066689 |

FIG. 11

SYSTEMS AND METHODS FOR OUT-OF-DISTRIBUTION CLASSIFICATION

CROSS REFERENCES

The present disclosure is a non-provisional application of and claims priority under 35 U.S.C. 119 to U.S. Provisional Application No. 62/937,079, filed on Nov. 18, 2019 and U.S. Provisional Application No. 62/968,959, filed on Jan. 31, 2020 which are hereby expressly incorporated herein by reference in their entirety.

The present disclosure is related to U.S. Nonprovisional application Ser. No. 16/877,333, filed on May 18, 2020, and U.S. Nonprovisional application Ser. No. 16/877,339, filed on May 18, 2020 which claims priority under 35 U.S.C. 119 to U.S. Provisional Application No. 62/937,085, filed on Nov. 18, 2019 and U.S. Provisional Application No. 62/968,973, filed on Jan. 31, 2020, all of which are hereby expressly incorporated herein by reference in their entirety.

TECHNICAL FIELD

The present disclosure relates generally to training and use of machine learning systems and more specifically to systems and methods for out-of-distribution classification.

BACKGROUND

Neural networks have been widely used for data classification, e.g., identifying which class from a set of pre-defined classes that an input data sample may belong to. For example, when a digital image is fed to the neural network, the image pixels may be classified as belonging to a set of pre-defined classes, e.g., indicating a shape, a pattern, an object, etc. in the image. Specifically, the neural network generates probabilistic distributions indicating a respective likelihood that the input image may belong to each pre-defined class. However, when the image does not belong to any of the pre-defined classes, the output probabilistic distributions from neural network can be highly inaccurate. In this case, pixels of the input image may be referred to as "out-of-domain" or "out-of-distribution" (OOD), as opposed to "in-domain" or "in-distribution" (ID) when the input image belongs to one of the pre-defined classes.

When the neural network is only trained to classify an input sample into pre-defined classes, the classification output in response to an OOD input can be highly inaccurate and even completely erroneous. Thus, to more accurately classify the input data, an OOD classification scheme is needed to identify inputs that may go beyond the pre-defined classes. However, due to the vast randomness of OOD inputs and the large scale of unseen dataset and domains, OOD identification has proven to be difficult.

BRIEF DESCRIPTION OF THE DRAWINGS

FIG. 11 is a simplified diagram illustrating example importance probabilities of words in an input sample, according to some embodiments.

Figure 1:
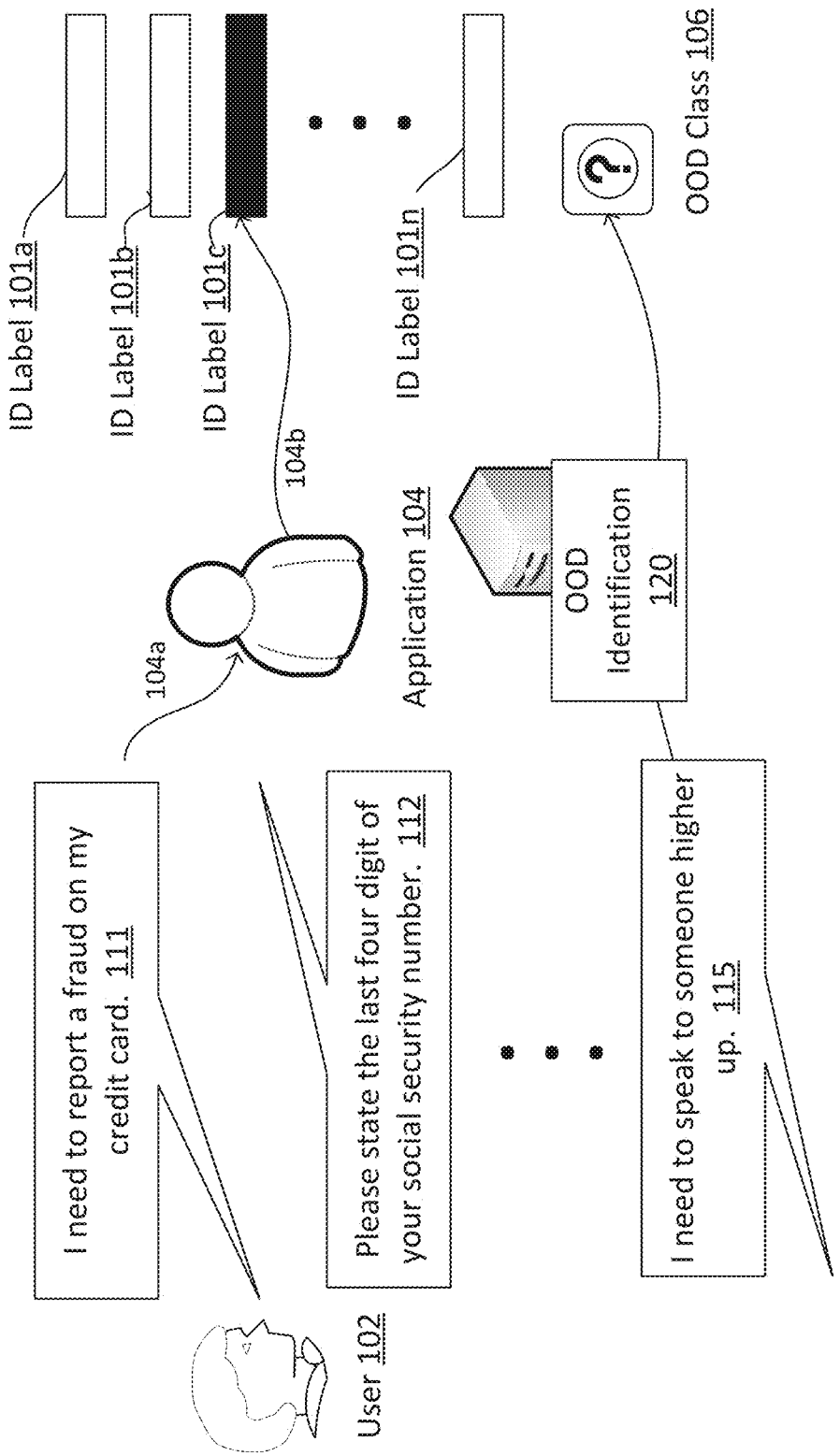
FIG. 1 is a simplified diagram illustrating an example artificial intelligence (AI) application that is built on in-distribution and OOD classification of input samples, according to some embodiments.

In the figures, elements having the same designations have the same or similar functions.

DETAILED DESCRIPTION

In view of the need for an OOD identification scheme with improved accuracy, embodiments described herein provide various training and implementation schemes for OOD detection.

Some existing systems preprocess the input data by adding small perturbations, thus for in-domain examples, a large change in output distribution may be expected even for a small change to the inputs, as against OOD examples. Thus, by measuring the scale of change in outputs, OOD examples may be identified. However, this model is not tractable to compute backpropagation during interference. An embodiment provided herein preprocesses the input samples to the classification neural network, e.g., by adding Gaussian noise to word/sentence representations to make the function of the neural network satisfy Lipschitz property such that a small change in the input does not cause much change to the output if the input sample is in-distribution. In this way, the accuracy of both in-domain and OOD identification can be improved.

Some existing systems uses hyperparameter search in a multidimensional space to classify input vector representations. For example, each pre-defined class is represented by a reference class vector in the multidimensional space, and an input vector representation is determined to belong to a pre-defined class based on the closest reference class vector.

However, when only a small training dataset is available, such dataset may not be sufficient for the neural network to learn the hyperparameters for the neural network to separate the multidimensional space with respect to different pre-defined classes. An embodiment described herein provides that a small dataset may be used for the neural network to learn characteristics of the radius of the input vector to the origin. In this way, an OOD vector may be identified when the OOD vector is sufficiently close to the origin (identified through learning), or when the OOD vector is orthogonal to all reference class vectors.

Some existing systems process input samples with a high feature dimension to improve the accuracy of classification, While the in-domain output may be sensitive to the dimensions and higher dimensions of the features may yield better in-domain output accuracy, however, higher feature dimension sometimes may lead to poor performance of OOD detection. For example, certain feature basis which do not contribute to classification may cause long tail accumulation for the OOD output. An embodiment proposed herein uses sparsification techniques to train the neural network with a high feature dimension that may yield desirable in-domain detection accuracy, but may prune away dimensions in the output that are less important. Specifically, a sparsification vector is generated based on Gaussian distribution (or other probabilistic distribution) and is used to multiply with the higher dimension output to reduce the number of feature dimensions. The pruned output may be then used for the neural network to learn the sparsification vector. In this way, OOD detection accuracy can be improved.

In some embodiments, training a neural model for OOD identification may be difficult due to a lack of OOD training samples. An embodiment proposed herein generates OOD training samples by feeding samples that are similar to in-domain samples but are semantically OOD. Specifically, the system may find candidate words in an in-domain sample to be replaced by other words for the sentence to be OOD. For example, in-domain examples may be "what is Mark's keynote?" "When is Mark's keynote?" or "Where is Mark's keynote?" The system may identify that words such as "what" "when" and "where" are the critical words that carry more weight in classifying the sentence into a pre-defined class, and may seek to replace these words with other random words to generate an OOD input, e.g., "How is Mark's keynote" is an OOD sample.

As used herein, the term "in-distribution" or "in-domain" (the two terms may be used interchangeably herein) refers to a characteristic of a data sample when the data sample belongs to one of a set of pre-defined classes.

As used herein, the term "out-of-distribution" or "out-of-domain" (the two terms may be used interchangeably herein, or as "OOD") refers to a characteristic of a data sample when the data sample does not belong to any of a set of pre-defined classes.

As used herein, the term "network" may include any hardware or software-based framework that includes any artificial intelligence network or system, neural network or system and/or any training or learning models implemented thereon or therewith.

As used herein, the term "module" or "model" may include any hardware or software-based framework that performs one or more functions. In some embodiments, the module may be implemented using one or more neural networks.

INTRODUCTION

FIG. 1 is a simplified diagram illustrating an example artificial intelligence (AI) application that is built on in-distribution and OOD classification of input samples, according to some embodiments. As shown in FIG. 1, a chat bot application 104 may communicate with a user 102, who may enter input sentences via a user interface. The chat bot application 104 may employ a neural network model to classify received input sentences from the user 102 according to a set of pre-defined classes, e.g., in-domain labels 101a-n. Based on the classification, the application 104 may in turn generate a response according to the identified label of the user input.

For example, when the user 102 says "I need to report a fraud on my credit card" 111, which is transmitted to the char bot 104 via communication interface 104a, the chat bot 104 may instantiate a neural classification model to classify the user communication 111 as related to the label "fraud" 111c, e.g., at 104b. The chat bot 104 may then retrieve a response that has been pre-defined for fraud handling, such as "please state the last four digits of our social security number" 112.

For another example, when the user says "I need to speak to someone higher up" 115, the chat bot 104 may not be able to identify which pre-defined label 101a-n the statement 115 belongs to. In this case, when the chat bot 104 is trained with OOD identification 120, the chat bot 104 may identify the input 115 as OOD, and allow a customer or a provider to define a response to be associated with the OOD class 106, such as reporting an error, or directing the user 102 to a representative, etc.

Therefore, as any random comment made by the user 102 may be an OOD input, such vast randomness may render OOD identification and training of the OOD identification 120 difficult.

Figure 2:
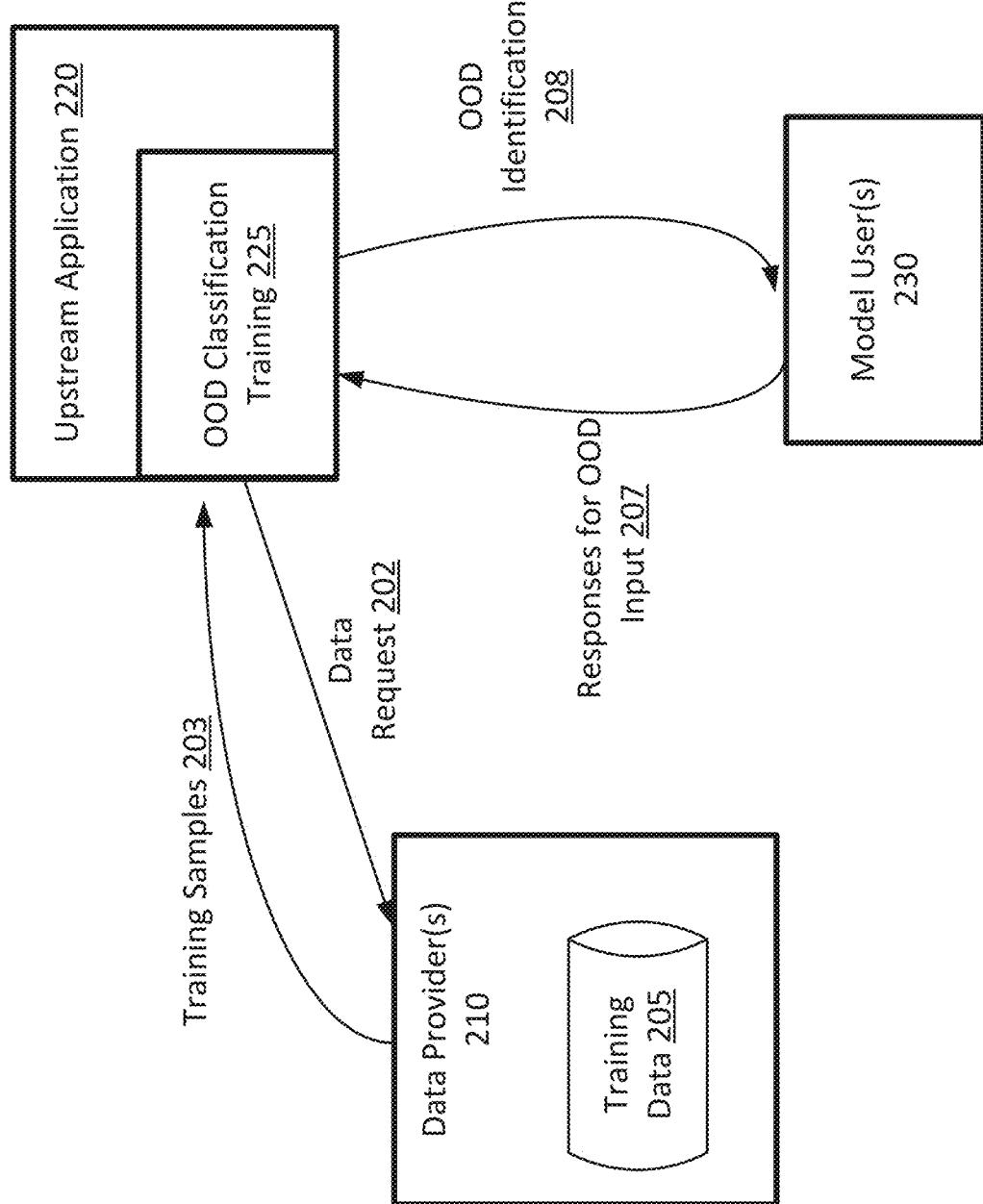
FIG. 2 is a simplified diagram illustrating an example data flow between different entities for a model user to obtain an AI application trained for OOD classification, according to some embodiments.

FIG. 2 is a simplified diagram illustrating an example data flow between different entities for a model user to obtain an AI application trained for OOD classification, according to some embodiments. Data provider(s) 210, an upstream application 220 (e.g., the chat bot application 104 in FIG. 1), and a model user 230 are shown to interact with each other. In some examples, the model user 230 may define a response 207 for an OOD input. For example, the upstream application 220 may send OOD identification 208 to the model user 230 when the upstream application 220 receives an OOD input (e.g., user communication 115 in FIG. 1), which may in turn define how the upstream application 220 should respond to such OOD input using responses for OOD input 207.

The upstream application 220 may operate an OOD classification training framework 225, which sends a data or model training request 202 to the data provider(s) 210. The data provider 210, which may store a dataset of training data 205, may in turn provide training samples 203 to the OOD classification training module 225.

Figure 3:
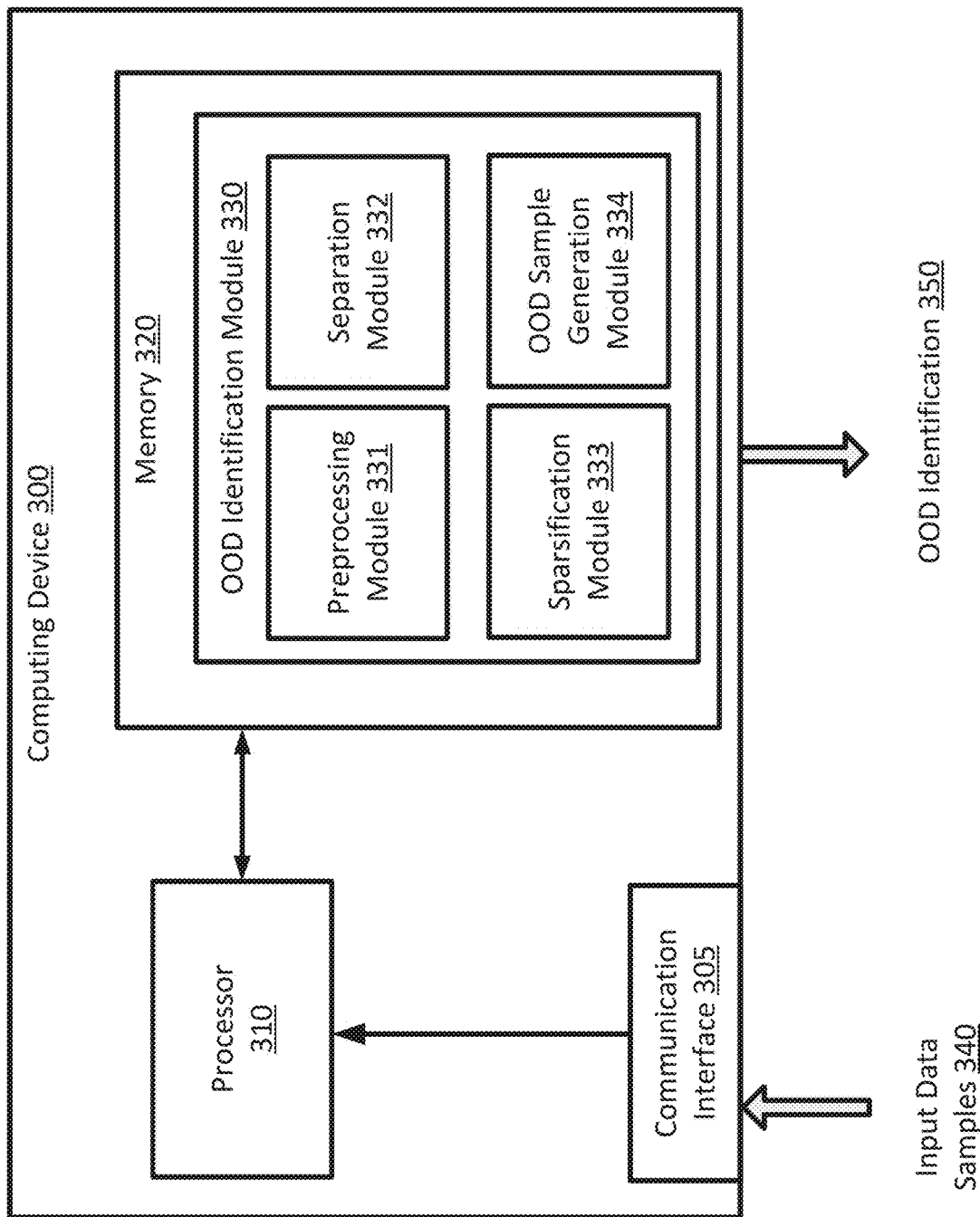
FIG. 3 is a simplified diagram of a computing device implementing the OOD identification framework, according to some embodiments.

FIG. 3A is a simplified diagram of a computing device implementing the OOD identification framework, according to some embodiments. As shown in FIG. 3A, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

Computing device 300 further includes a communication interface 305 that is operable to receive and transmit data to one or more other computing devices, such as the data providers 210. In some examples, data may be sent to or received from the data providers 210 via the communication interface 305.

Memory 320 includes an OOD identification module 330 that may be used to implement a machine learning system and model described further herein and/or to implement any of the methods described further herein. In some examples, the OOD identification module 330 may also handle the iterative training and/or evaluation of OOD identification module 330 as is described in further detail below. In some examples, OOD identification module 330 may include a machine learning structure, such as one or more neural networks, deep convolutional networks, and/or the like.

In some examples, memory 320 may include non-transitory, tangible, machine readable media that includes executable code that when run by one or more processors (e.g., processor 310) may cause the one or more processors to perform the methods described in further detail herein. In some examples, each of the OOD identification modules 330 and/or OOD training module 360 may be implemented using hardware, software, and/or a combination of hardware and software. As shown, computing device 300 receives an input batch of data samples 340 and generates a classification output which may include OOD identification 350.

The OOD identification module 330 includes a number of submodules such as the preprocessing module 331, the separation module 332, the sparsification module 333 and the OOD sample generation module 334. The preprocessing module 331 is configured to receive and preprocess the input data samples 340 by adding a Gaussian noise component to each input data sample at the word or sentence level to render the input-output transformation function with a Lipschitz property. Further details and implementations of the preprocessing module 331 are discussed in relation to FIGS. 4-5.

The separation module 332 is configured to learn characteristics of the vector representations of in-distribution and OOD input samples from the penultimate layer, as compared against reference class vectors geometrically separating a multi-dimensional space. The separation module 332 is then configured to use the learned characteristics to distinguish in-distribution or OOD inputs. Further details and implementations of the separation module 332 are discussed in relation to FIGS. 6-7.

The sparsification module 333 is configured to train the OOD identification module 330 with a higher feature dimension, but then prune away feature dimensions that are less important in the classification outputs, in order to enhance hardware resource efficiency. Further details and implementations of the sparsification module 333 are discussed in relation to FIGS. 8-10.

The OOD sample generation module 334 is configured to generate OOD training samples from in-distribution training samples, e.g., by feeding sentences that are similar to in-distribution samples but are semantically OOD to train the OOD identification module 330. Further details and implementations of the sparsification module 333 are discussed in relation to FIGS. 11-13.

As discussed above and further emphasized here, FIG. 3 is merely an example which should not unduly limit the scope of the claims. One of ordinary skill in the art would recognize many variations, alternatives, and modifications. According to some embodiments, one or more of the one or more OOD identification module 330 may be located in one or more computing devices separate from computing device 300. In some examples, the separate computing devices may be consistent with computing device 300.

Lipschitz Preprocessing

For deep neural networks (DNNs) that are trained for classification, when the DNNs are robust to adversarial inputs, such DNNs perform better for OOD tasks as compared to DNNs that are not robust to adversarial inputs. A property of DNNs that are robust to adversarial inputs is that such DNNs learn functions that are Lipschitz tight, e.g., given different inputs x, y, the outputs $f(x)$ and $f(y)$ satisfies a property that $\|f(x)-f(y)\| < C \|x-y\|$, where $f(\ )$ represents the function corresponding to the DNN, and C is a constant. In one embodiment, Gaussian noise may be added to the inputs x, y to make the function $f(\ )$ of the DNN Lipschitz tight.

Figure 4:
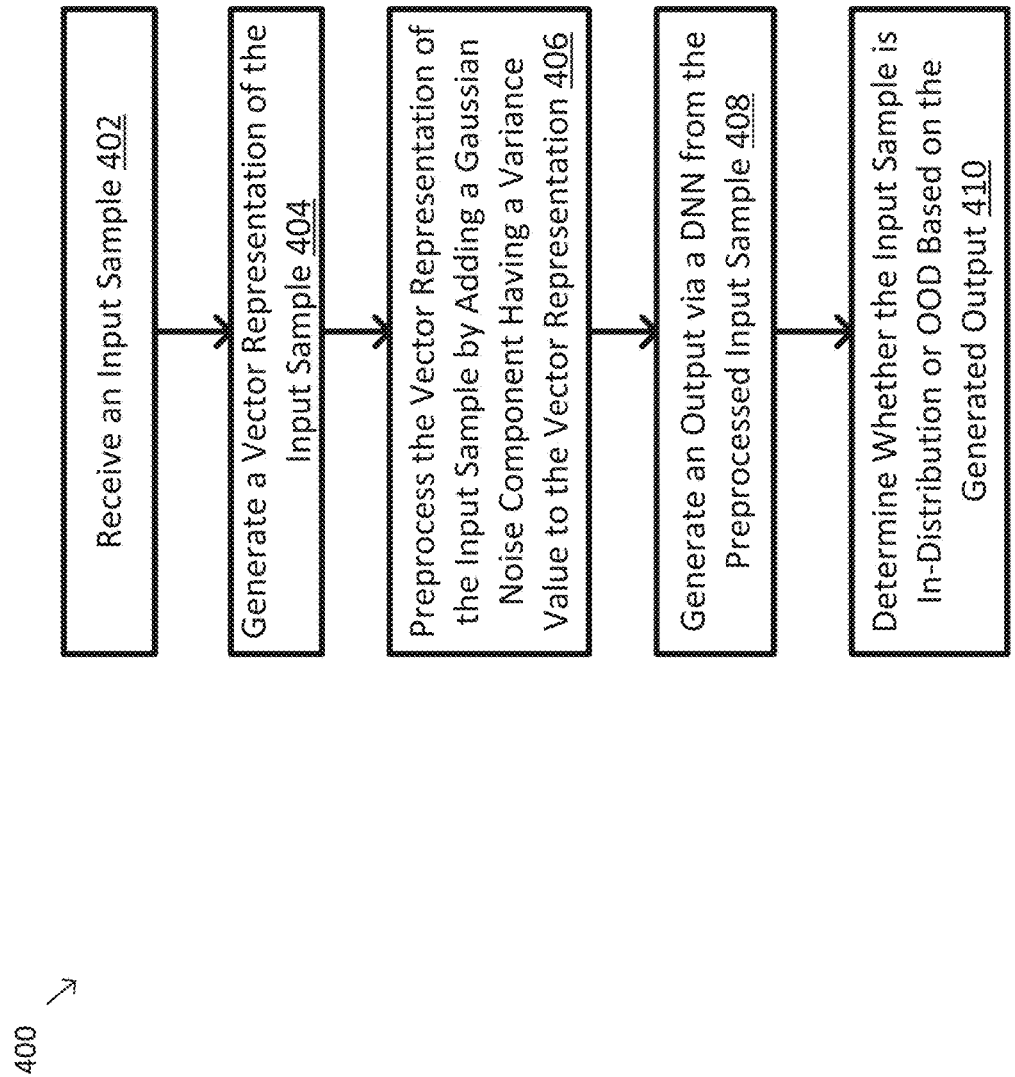
FIG. 4 is a simplified logic flow diagram of a method for OOD identification with preprocessed input samples, according to some embodiments.

FIG. 4 is a simplified logic flow diagram of a method for OOD identification with preprocessed input samples, according to some embodiments. One or more of the processes 402-410 of method 400 may be implemented, at least in part, in the form of executable code stored on non-transitory, tangible, machine-readable media that when run by one or more processors (e.g., processor 310) may cause the one or more processors to perform one or more of the processes 402-410. In some embodiments, method 400 may correspond to the methods used by the OOD identification module 330 via the preprocessing module 331.

At step 402, an input sample may be received, e.g., input samples 340 may be received via communication interface 305 shown in FIG. 3A. In some embodiments, the input sample may be a natural language sentence such as 111 or 115 in FIG. 1.

At step 404, a vector representation of the input sample may be optionally generated.

At step 406, the vector representation of the input sample may be preprocessed by adding a Gaussian noise component having a variance value to the vector representation such that the resulting input-output function of the neural network satisfies the Liptschitz property. For example, the Gaussian noise may be added at the word level or at the sentence level of the input sample. For each language, the variance of the Gaussian noise is estimated and learned via backpropagation to render the learned function of the neural network Liptschitz tights.

At step 408, a classification output is then generated from the neural network from the preprocessed input sample. For example, the output may take a form as classification probabilities indicating a likelihood that the input sample belongs to a pre-defined class or is OOD.

At step 410, the neural network determines whether the input sample is in-distribution or out-of-distribution based on the generated classification output. For example, a pre-defined threshold may be used to determine whether the input sample is in-distribution or OOD depending on whether a classification probability is greater or less than the pre-defined threshold.

In some embodiments, with input samples obtained from a training dataset (e.g., 205 in FIG. 2), method 400 may be repeated to train the neural network using a loss computed from the classification output generated from the preprocessed input sample. In some embodiments, the preprocessing with Gaussian noise may be performed only during the training phase. The expectation is that the in-domain and ODD performance of the trained neural network is not affected by the added Gaussian noise.

Figure 5:
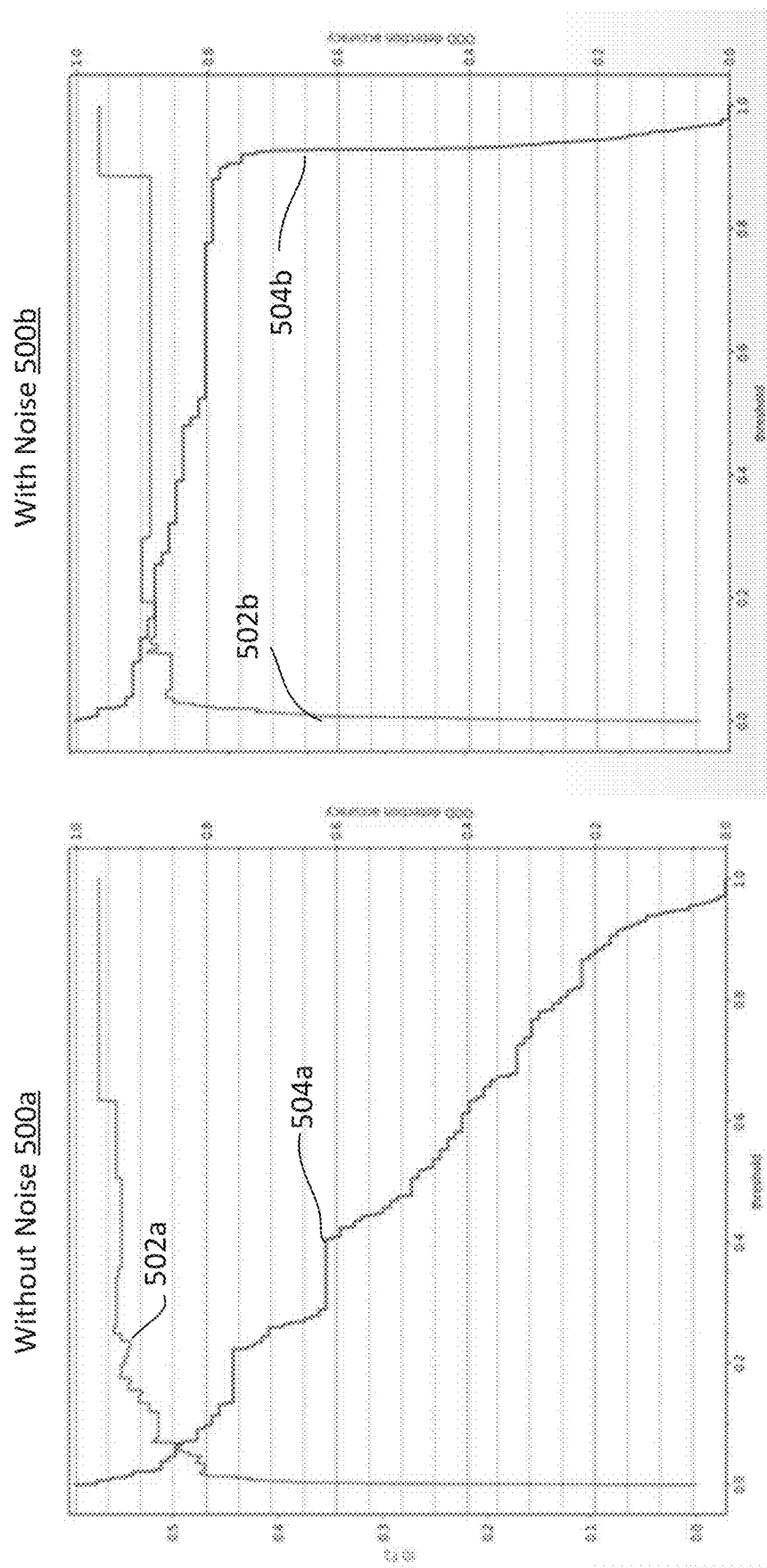
FIG. 5 is a diagram of performance data plots of OOD and in-distribution identification accuracy with or without preprocessing with added noise discussed in relation to FIG. 4, according to some embodiments.

FIG. 5 is a diagram of performance data plots of OOD and in-distribution identification accuracy with or without preprocessing with added noise discussed in relation to FIG. 4, according to some embodiments. Data plots 500a and 500b shows comparisons of OOD identification performance (measured by accuracy, shown by curve 504a in data plot 500a and 504b in data plot 500b) and in-distribution identification performance (measured by F1 score, shown by curve 502a in data plot 500a and 502b in data plot 500b) without added noise and with added noise, respectively, against OOD probability (the x-axis).

As shown by 500a-b, with added noise, for a much broader range of OOD probabilities on the x-axis, the OOD performance 504b and the in-distribution performance 502b achieve a better performance level than the OOD performance 504a and the in-distribution performance 502a. Therefore, the preprocessing with added Gaussian noise to the input samples may improve both the in-distribution and OOD performance of the neural network.

Separation of OOD Vectors

When OOD examples are passed through a DNN at the penultimate layer right before the final softmax layer, the representation from the penultimate layer tend to be closer to the origin when compared to those of in-domain counterparts. The OOD example may thus be forced to be closer to the origin by training the DNN with random OOD examples and penalizing the penultimate layer outputs if they are a pre-defined distance away from the origin. This technique requires a couple of hyper-parameters to be tuned to achieve optimal performance. To tune these hyper-parameters, some of the training data needs to be set aside. As training data can be scarce, hyper-parameter tuning may not always be feasible. Instead of hyper-parameter tuning, the characteristics of the OOD samples while passing through the penultimate layer can be utilized to identify the OOD samples, e.g., an OOD representation at the penultimate layer can be either closed to the origin or on a plane that is orthogonal to all the in-domain classes.

Figure 6:
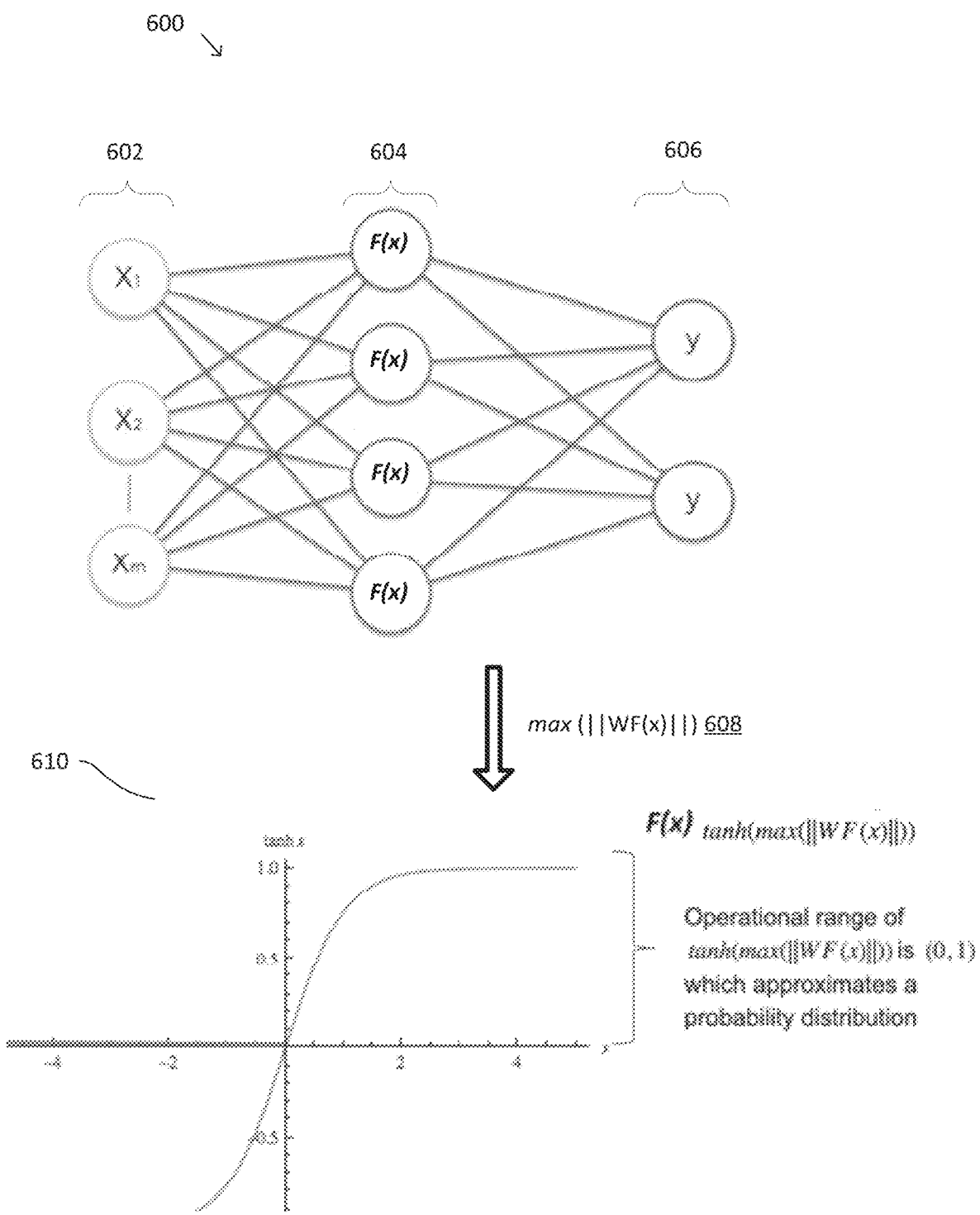
FIG. 6 is a simplified diagram illustrating OOD identification via a deep convoluted neural network (DCNN) using separation of reference class vectors in a low sample regime, according to some embodiments.

FIG. 6 is a simplified diagram illustrating OOD identification via a deep neural network (DNN) 600 using separation of reference class vectors in a low sample regime, according to some embodiments. DNN 600 is shown with an input layer 602 receiving input samples $X_1 \ldots X_m$, one or more hidden layer(s) 604 that transforms the input samples with a function F( ), and the output layer 606 that generates the output Y. When the DNN 600 is trained with OOD samples, characteristics of the output of the penultimate layer, referred to as the representation of the penultimate layer, F(x) entails that the ODD example would have a representation to be either close to the origin or any plane that is orthogonal to the representations of all the in-domain classes.

Specifically, at the output layer 606, the classification output may be computed as:

$$P(Y|ID,X)=\text{softmax}(WF(x)), P(ID|X)=\tan h(\max(\|WF(x)\|))$$

$$P(Y,ID|X)=P(Y|ID,X)P(ID|X)$$

$$P(Y|X)=[P(Y,ID|X),P(ID|X)]$$

where W is a kernel of weights that may be learned, F(x) is the output of the penultimate layer, ID stands for the condition that input x belongs to an in-domain class. In other words, the pre-defined classes may be viewed as sub-spaces separated by a set of reference class vectors in a multi-dimensional space. The vector representation F(x) from the penultimate layer is compared with the reference class vectors to determine whether F(x) belongs to a particular reference class, e.g., when F(x) is the closest to the particular reference class vector. In particular, max ($\|WF(x)\|$) computed at 608 computes the minimum angle made by the representation (F(x)) of an input x against an in-domain class representation that is the closest to the vector F(x). The tan h(.) transformation, as shown in diagram 610, transforms this distance max ($\|WF(x)\|$) to the origin to a probability distribution of value between 0 and 1, and this probability indicates whether the given input x is in-domain or OOD.

Specifically, the loss function may be computed as $$\text{loss}=-Y\log(P(Y|X))$$

which may be used to learn the kernel of weights W.

Figure 7:
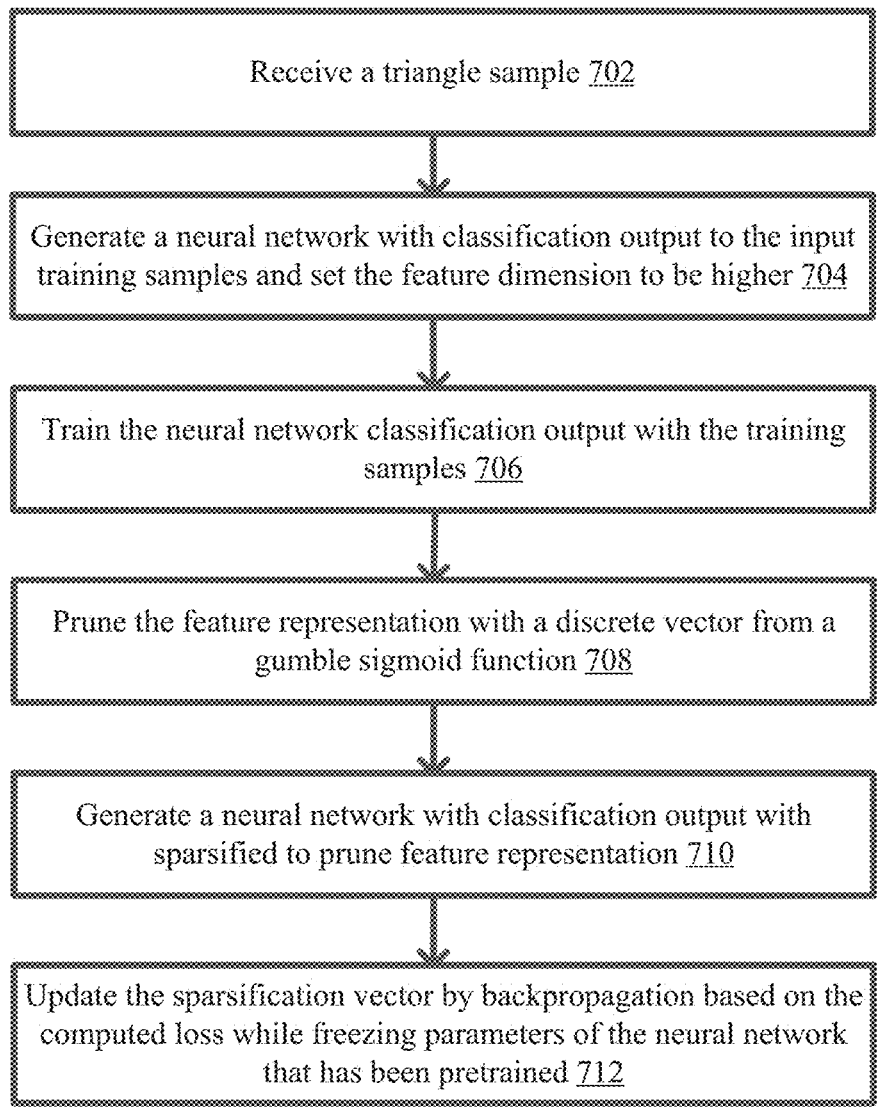
FIG. 7 is a simplified logic flow diagram of a method for OOD identification using separations of reference class vectors in a low sample regime, according to some embodiments.

FIG. 7 is a simplified logic flow diagram of a method for OOD identification using separations of reference class vectors in a low sample regime, according to some embodiments. One or more of the processes 702-714 of method 700 may be implemented, at least in part, in the form of executable code stored on non-transitory, tangible, machine-readable media that when run by one or more processors (e.g., processor 310) may cause the one or more processors to perform one or more of the processes 702-712. In some embodiments, method 700 may correspond to the methods used by the OOD identification module 330 via the separation module 332.

At step 702, an input sample may be received, e.g., input samples 340 may be received via communication interface 305 shown in FIG. 3A. In some embodiments, the input sample may be a natural language sentence such as 111 or 115 in FIG. 1.

At step 704, a vector representation of the input sample may be generated at a penultimate layer of the neural network, e.g., the vector F(x) generated at layer 604 of DNN 600 shown in FIG. 6.

At step 706, a number of reference class vectors corresponding to a number of pre-defined classes are retrieved. For example, the pre-defined classes may be viewed as sub-spaces separated by a set of reference class vectors in a multi-dimensional space.

At step 708, the vector representation of the input sample is compared against the number of reference class vectors. For example, the vector representation F(x) from the penultimate layer is compared with the reference class vectors to determine whether F(x) belongs to a particular reference class, e.g., when F(x) is the closest to a particular reference class vector.

At step 710, the minimum angle made by the vector representation (F(x)) of an input x against an in-domain class representation that is the closest to the vector F(x) is computed by maximizing a distance of the vector product WF(x), e.g., max ($\|WF(x)\|$).

At step 714, the maximized distance of the vector product WF(x) is converted to a probability value indicating a likelihood that the input sample is in-distribution or OOD. For example, a tan h(.) operation is applied to transform the distance max ($\|WF(x)\|$) to a probability distribution of value between 0 and 1, and this probability indicates whether the given input x is in-domain or OOD. Based on the probability, it can be determined whether the input sample is in-distribution or OOD. In particular, when the vector representation of the input sample F(x) is orthogonal to the number of reference class vectors or is close to the origin for less than a pre-defined threshold distance, the input sample x may be determined to be OOD.

Feature Dimension Sparsification

For a DNN, the representation learnt by the DNN for each pre-defined class doe s not usually require all the allocated hidden feature dimensions. Barring a few feature dimensions may not impair classification performance due to the existence of noise that may impede the ODD performance. Thus, after training a DNN with pre-defined classifiers, the weights for feature dimensions that do not contribute to identifying an in-domain class can be set to zero, which does not affect the classification performance significantly.

Specifically, while inputs with a higher dimension may result in better in-domain classification performance of the DNN, the higher dimension can also yield a poor performance for OOD detection accuracy. Basis (dimensions) that do not contribute to classification gets used by tan h($\|f(X)W\|$) (a case of long tail accumulation of bias), where X is the input, $f(X)$ is the penultimate layer of NN output vector and W is the weight of the OOD classifier. Thus, the DNN may be trained with a higher dimension but may prune away basis/dimensions that are less important.

Figure 8:
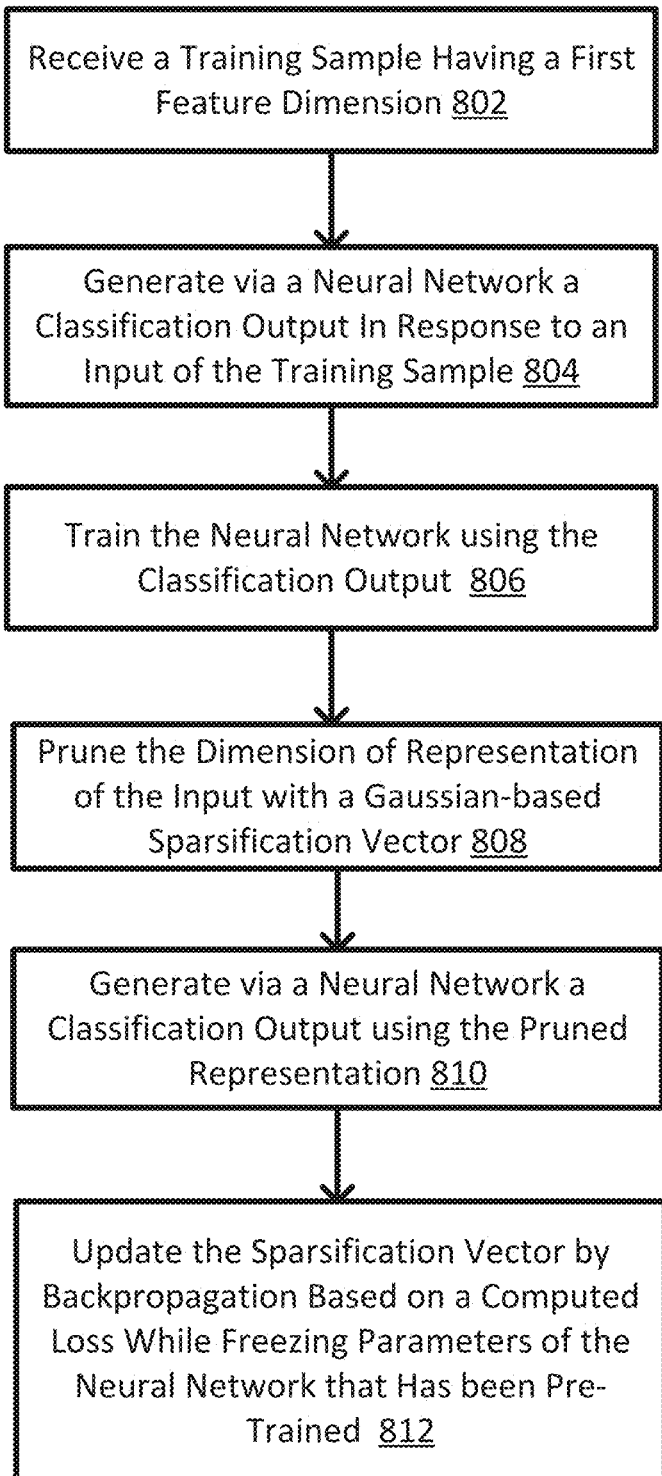
FIG. 8 is a simplified logic flow diagram of a method for OOD training and using sparsification to reduce the dimension of classification outputs, according to some embodiments.

FIG. 8 is a simplified logic flow diagram of a method 800 for OOD training and using sparsification to reduce the dimension of classification outputs, according to some embodiments. One or more of the processes 802-810 of method 800 may be implemented, at least in part, in the form of executable code stored on non-transitory, tangible, machine-readable media that when run by one or more processors (e.g., processor 310) may cause the one or more processors to perform one or more of the processes 802-810. In some embodiments, method 800 may correspond to the methods used by the OOD identification module 330 via the sparsification module 333.

At step 802, an input training sample having a first feature dimension may be received, e.g., input samples 340 may be received via communication interface 305 shown in FIG. 3A. In some embodiments, the input sample may be a natural language sentence such as 111 or 115 in FIG. 1.

At step 804, a classification output is generated, via the neural network, in response to an input of the training sample.

At step 806, the neural network is trained using the classification output to obtain a set of parameters for the neural network.

At step 808, the dimension of the representation of the input is pruned with a discrete sparsification vector generate by a gumble sigmoid. For example, a sparsification vector is defined $$S = \text{gumble}_{sigmoid}(x \odot 0, \tau), \text{ i.e. } S = \frac{1}{1 + \exp(-(W \; x \odot 0 + b + g)/\tau)}.$$

by an Here g is a gumble noise, 0 is a null vector, the parameter $\tau$ is the temperature a hyperparameter which is set to 1 at the start of the training and gradually reduced over the period of training. The $f(x) \in R^d$ and $S \in R^{d \times c}$ where d is the hidden dimension of the penultimate layer of the DNN classifier and c is the number of in-domain classifiers of the dataset. This temperature parameter forces the sigmoids to discretely select the linearly independent basis of the class representation for discriminating one class against another—in this way, the unused or noisy dimensions of the representation of each in-domain class may be set to zero.

At step 810, a classification output of the neural network is modified to incorporate the sparsification vector, which is represented as:

$$P(Y|X) = \text{softmax} \, f(X)(W_c) \odot S + b_c)$$

Where $W_C$ and $b_C$ are the weights and bias of the in-domain classifier from the earlier training and are fixed. Here X represents the input, Y represents the classification output, W represents the vector of weight of the feature layer and $W \in R^{d \times c}$, and the $\odot$ operation represents the Hadamard product.

At step 812, the sparsification vector may be updated by backpropagation based on a computed loss based on the output while freezing parameters of the neural network that has been trained from step 806. For example, the loss may be computed by:

$$\text{loss} = -Y \log(P(Y|X) + \alpha|S|$$

where $\alpha$ is a hyper-parameter. This loss may be backpropagated to update the sparsification vector S.

Figure 9:
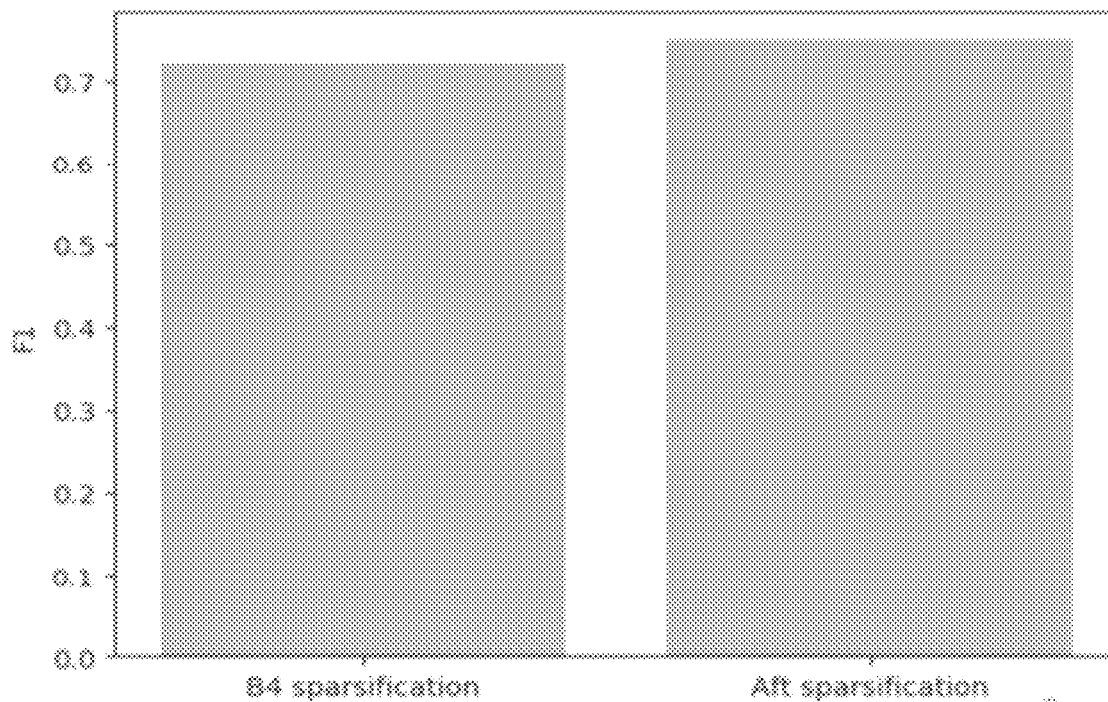
FIG. 9 is a simplified diagram of performance data plots illustrating the in-distribution identification accuracy before and after sparsification of classification outputs, according to some embodiments.

FIG. 9 is a simplified diagram of performance data plots illustrating the in-distribution identification accuracy before and after sparsification of classification outputs, according to some embodiments. The in-distribution identification accuracy is measured by the F1 score. As shown in FIG. 9, the in-distribution F1 scores of a DNN before and after sparsification are comparable. Thus, sparsification does not significantly affect the in-distribution identification performance.

Figure 10:
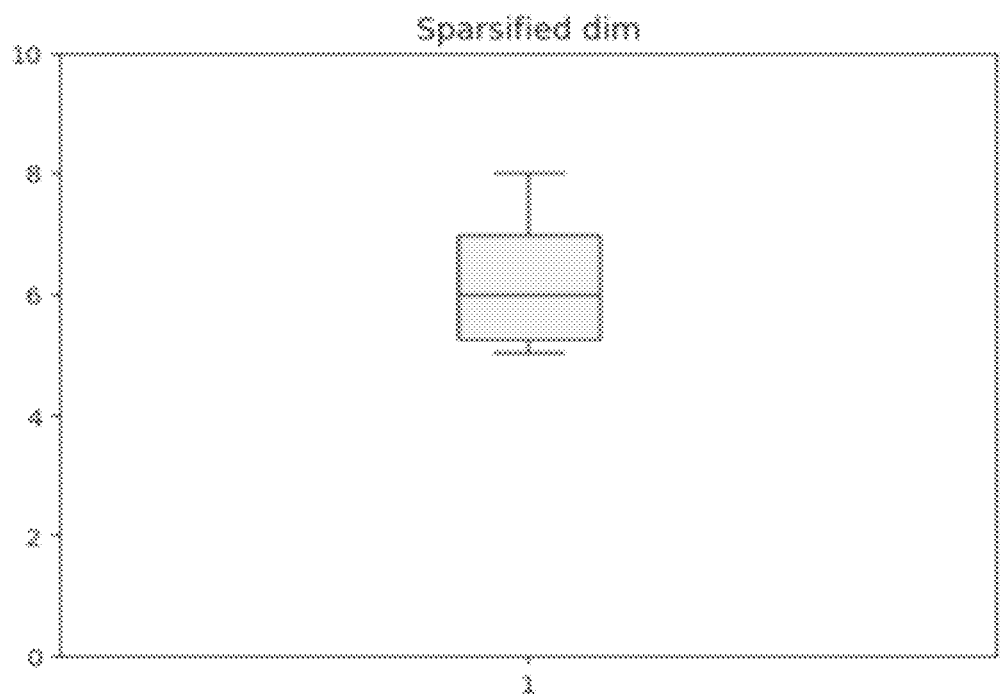
FIG. 10 is a simplified diagram illustrating reduced dimension of classification outputs, according to some embodiments.

FIG. 10 is a simplified diagram illustrating reduced dimension of classification outputs, according to some embodiments. As shown in FIG. 10, an original feature dimension before sparsification of 30 may be shortened to less than 4, significantly improving computational complexity and resource efficiency.

OOD Sample Generation

Classification DNNs may be trained with a training dataset, e.g., see training dataset 205 in FIG. 2, where the training samples may be mostly in-domain. Such in-domain samples may not be ideal in training the DNN for OOD detection. In some embodiments, input samples that are similar to the in-domain samples but are semantically OOD can be used to train the DNN for OOD detection. In this case, candidate words in an in-domain example need to be replaced with random words to become an OOD sample, which may be implemented by learning a clear separation boundary between in-domain and OOD samples.

FIG. 11 is a simplified diagram illustrating example importance probabilities of words in an input sample, according to some embodiments. FIG. 11 shows an example in-domain input sample containing words "when is the seminar for developers keynote," which has been classified as belonging to a pre-defined class "Keynote Agenda." Word importance probabilities for each word are provided to show how each word contributes to the classification of the specific label "Keynote Agenda."

For example, an inter-class word importance probability is computed for each word based on term frequency-inverse document frequency (TF-IDF) of the respective word in the set of in-distribution training samples, e.g., the TF-IDF probabilities shown in FIG. 11. The TF-IDF behavior can thus be learnt to identity which words of the input sentence discriminate one pre-defined class against another pre-defined class, e.g., the higher the TF-IDF probability is, the more discriminatory the word is. In this example, words such as "seminar" and "developers" are considered to be the most discriminatory as having high TF-IDF probabilities.

For another example, an in-distribution word importance probability is computed for each word, which differentiates an in-distribution sample and an out-of-distribution sample for the respective element, e.g., the ID probabilities shown in FIG. 11. The ID probabilities may help to learn a discriminator model on the in-domain and random OOD data, e.g., the higher the ID probability is, the more likely the word contributes to an in-domain classification. In this example, words such as "when," "is," "seminar," "keynote" are more likely to appear in an in-domain sample.

A combined probability can thus be computed based on the TF-IDF based probability (a probability obtained by normalizing class-based TF-IDF word scores across the input sentence) and a word level in-domain probability (which is obtained by training a linear classifier with in-domain examples and random out-of-domain examples, e.g., random examples from Internet sources). The word-level in-domain probability may represent a probability that when the respective word candidature is replaced with a random word, e.g., from a corpus like Wikipedia, the resulting new sentence may become an OOD sample. In some embodiment, the combined probability may be computed based on a weighted sum of the TF-IDF probability and the in-domain probability. The combined probability is obtained by multiplying the TF-IDF based probability for each word in the sentence with corresponding word level in-domain probability.

For example, given the in-domain input sentence "when is the seminar for developers keynote," the words "when," "developers" and "seminar" are good candidate for replacement with random words. If one or more of these words are replaced with random words to form a new sentence, e.g., "how is the game for apple keynote," the resulting generated sentence may take a similar sentence structure to the original in-domain sentence but semantically it is an OOD sentence, because it no longer makes sense in the category of class "Keynote Agenda." Thus, for each in-domain training sentence, one or more OOD sentences can be generated, which can be used as OOD training samples to train the DNN for OOD detection.

Figure 12:
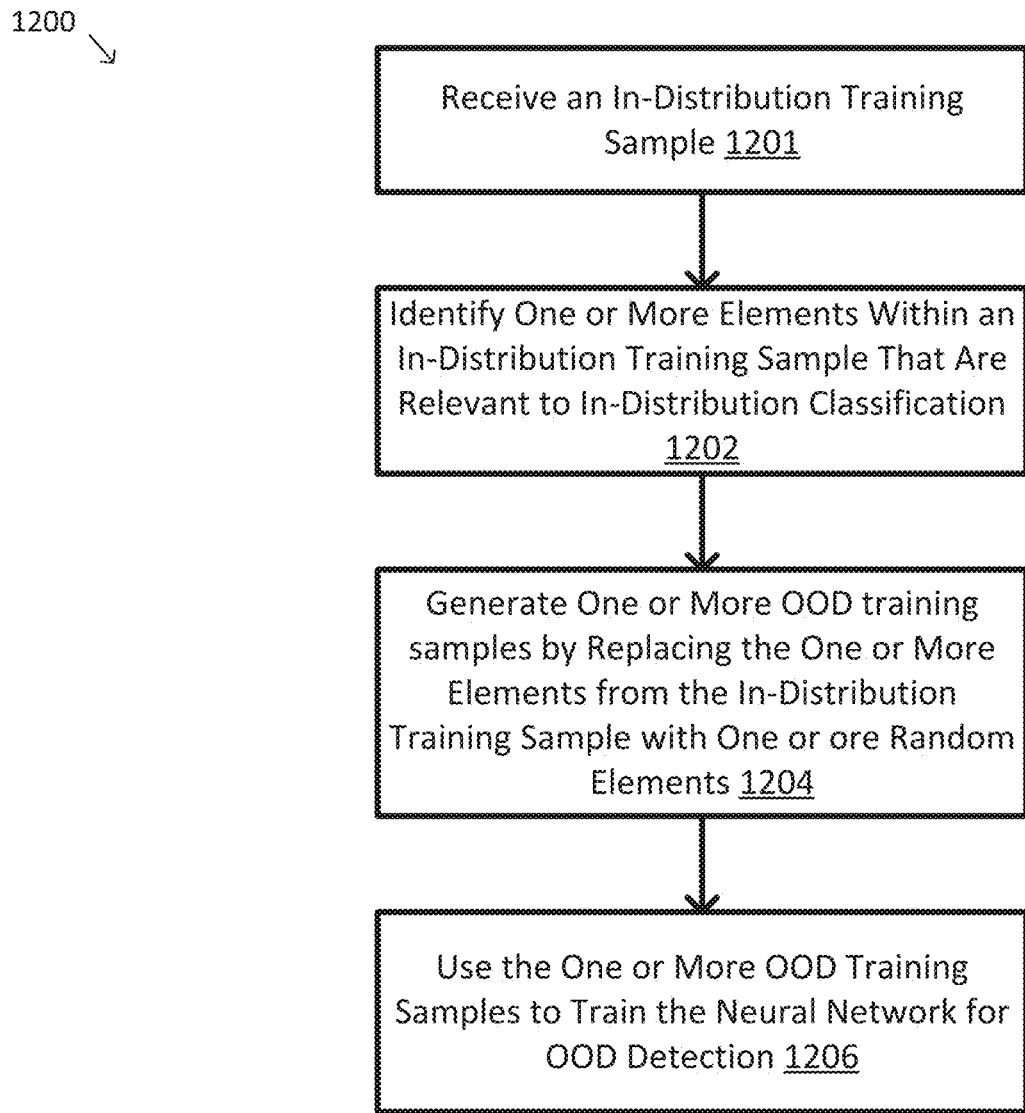
FIG. 12 is a simplified logic flow diagram illustrating a method for OOD classification training with OOD samples generated from in-distribution samples, according to some embodiments.

FIG. 12 is a simplified logic flow diagram illustrating a method for OOD classification training with OOD samples generated from in-distribution samples, according to some embodiments. One or more of the processes 1201-1206 of method 1200 may be implemented, at least in part, in the form of executable code stored on non-transitory, tangible, machine-readable media that when run by one or more processors (e.g., processor 310) may cause the one or more processors to perform one or more of the processes 1201-1206. In some embodiments, method 400 may correspond to the methods used by OOD training module 360 via the OOD sample generation module 334.

At step 1201, an in-distribution input training sample may be received, e.g., input samples 340 may be received via communication interface 305 shown in FIG. 3A. In some embodiments, the input sample may be a natural language sentence such as 111 in FIG. 1.

At step 1202, one or more elements within an in-distribution training sample that are relevant to in-distribution classification based on word importance probabilities may be identified. For example, as discussed in relation to FIG. 11, given the in-domain input sentence "when is the seminar for developers keynote," the words "when," "developers" and "seminar" are good candidate for replacement with random words.

At step 1204, one or more OOD training samples may be generated by replacing the one or more elements from the in-distribution training sample with one or more random elements. For example, the words "when," "developers" and "seminar" may be replaced with random words to form a new sentence, e.g., "how is the game for apple keynote," semantically an OOD sentence.

At step 1206, the generated one or more OOD training samples may be used to train the neural network for OOD detection.

Figure 13:
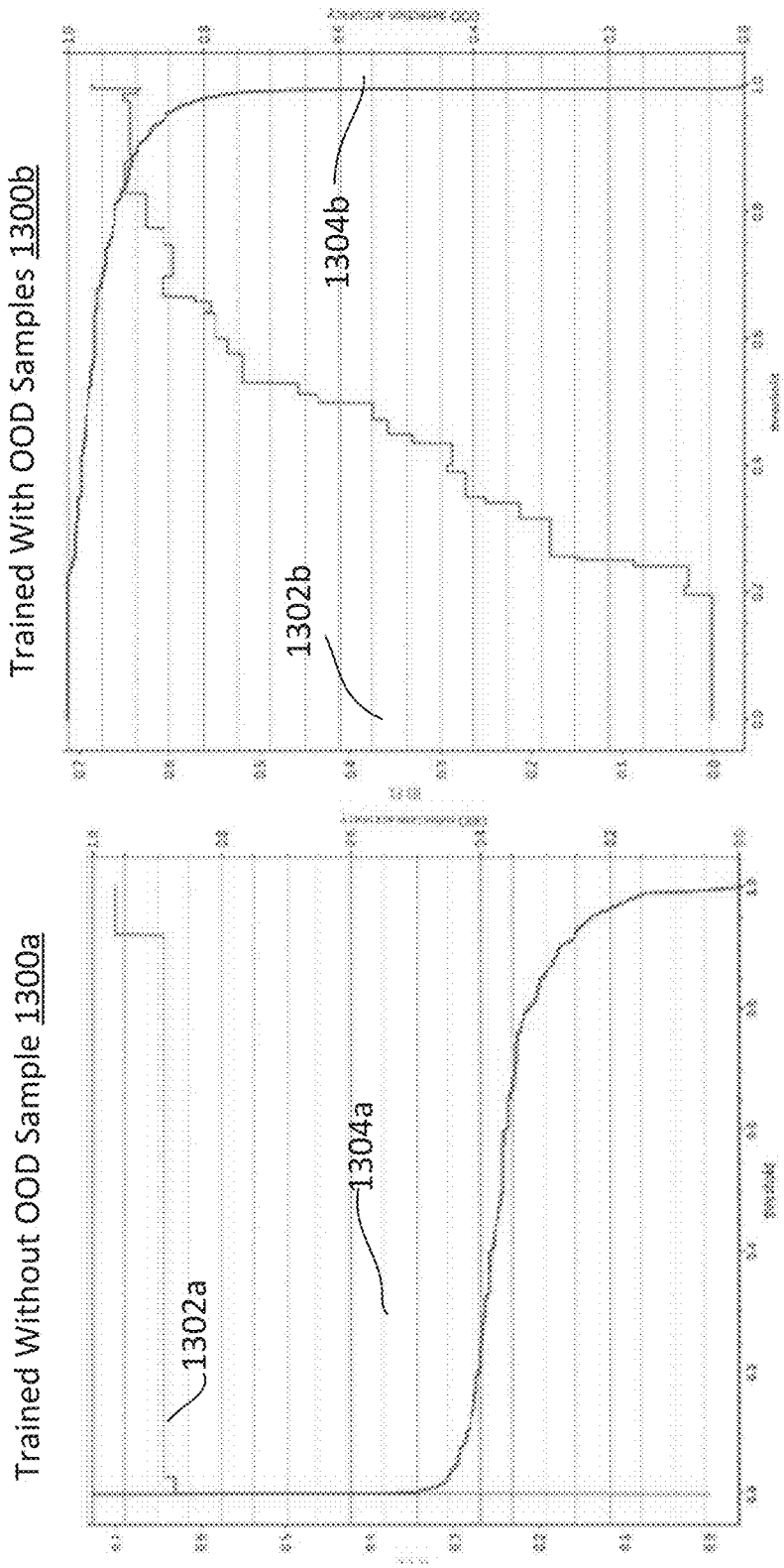
FIG. 13 is a simplified diagram of performance data plots illustrating the in-distribution and OOD identification accuracies with or without OOD samples generated using the method of FIG. 12, according to some embodiments.

FIG. 13 is a simplified diagram of performance data plots illustrating the in-distribution and OOD identification accuracies with or without OOD samples generated using the method of FIG. 12, according to some embodiments. Data plots 1300a and 1300b show comparisons of OOD identification performance (measured by accuracy, shown by curve 1304a in data plot 1300a and 1304b in data plot 1300b) and in-distribution identification performance (measured by F1 score, shown by curve 1302a in data plot 1300a and 1302b in data plot 1300b) trained without OOD samples and with OOD samples, respectively, against OOD probability (the x-axis).

As shown by 1300a-b, with added noise, for a much broader range of OOD probabilities on the x-axis, the OOD performance 1304b and the in-distribution performance 1302b achieve a better performance level than the OOD performance 1304a and the in-distribution performance 1302a. Therefore, by using generated OOD samples from in-domain training data, the combined performance of in-distribution and OOD detection of the neural network is improved.

Some examples of computing devices, such as computing device 300 may include non-transitory, tangible, machine readable media that include executable code that when run by one or more processors (e.g., processor 320) may cause the one or more processors to perform the processes of methods 400, 700, 800 and 1200. Some common forms of machine readable media that may include the processes of methods 400, 700, 800 and 1200 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for identifying out-of-distribution data samples using a neural network, the system comprising:
   a communication interface that receives an input sample;
   a memory containing machine readable medium storing machine executable code; and
   one or more processors coupled to the memory and configurable to execute the machine executable code to cause the one or more processors to:
      generate a vector representation of the input sample;
      preprocess the vector representation of the input sample by adding a Gaussian noise component having a variance value to the vector representation that yields an input-to-output function Lipschitz tight;
      generate an output via the neural network from the preprocessed input sample; and
      determine whether the input sample is in-distribution or out-of-distribution based on the generated output.

2. The system of claim 1, wherein the one or more processors are configurable to execute the machine executable code to cause the one or more processors to:
   add the Gaussian noise component to each vector representation of a respective word within the input sample.

3. The system of claim 1, wherein the one or more processors are configurable to execute the machine executable code to cause the one or more processors to:
   add the Gaussian noise component at a sentence level of the input sample.

4. The system of claim 1, wherein the one or more processors are configurable to execute the machine executable code to cause the one or more processors to:
   select the variance value such that after the preprocessing with the Gaussian noise component, a resulting function corresponding to the neural network satisfies a Lipschitz condition.

5. The system of claim 1, wherein the one or more processors are configurable to execute the machine executable code to cause the one or more processors to:
   train the neural network using a loss computed from the classification output generated from the preprocessed input sample.

6. A method for identifying out-of-distribution data samples using a neural network, the method comprising:
   receiving, via a communication interface, an input sample;
   generating a vector representation of the input sample;
   preprocessing the vector representation of the input sample by adding a Gaussian noise component having a variance value to the vector representation that yields an input-to-output function Lipschitz tight;
   generating an output via the neural network from the preprocessed input sample; and
   determining whether the input sample is in-distribution or out-of-distribution based on the generated output.

7. The method of claim 6, further comprising:
   adding the Gaussian noise component to each vector representation of a respective word within the input sample.

8. The method of claim 6, further comprising:
   adding the Gaussian noise component at a sentence level of the input sample.

9. The method of claim 6, further comprising:
   selecting the variance value such that after the preprocessing with the Gaussian noise component, a resulting function corresponding to the neural network satisfies a Lipschitz condition.

10. The method of claim 6, further comprising:
    training the neural network using a loss computed from the classification output generated from the preprocessed input sample.

11. A method for identifying out-of-distribution data samples using a neural network, the method comprising:
    receiving, via a communication interface, an input sample;
    generating, at a penultimate layer of the neural network, a vector representation of the input sample;
    retrieving a number of reference class vectors corresponding to a number of pre-defined classes;
    comparing the vector representation of the input sample against the number of reference class vectors; and
    determining whether the input sample is in-distribution or out-of-distribution based on whether the vector representation of the input sample is orthogonal to the number of reference class vectors based on the comparison.

12. The method of claim 11, further comprising:
    determining whether the input sample is in-distribution or out-of-distribution based on whether the vector representation of the input sample is within a threshold distance to an origin of a multi-dimensional space hosting the number of reference class vectors.

13. The method of claim 11, wherein the comparing the vector representation of the input sample against the number of reference class vectors comprises:
    multiplying a kernel vector of weights to the vector representation of the input sample from the penultimate layer.

14. The method of claim 13, further comprising:
computing a minimum angle made by the vector representation against one of the number of reference class vectors by maximizing a distance of a vector product from an origin.

15. The method of claim 14, further comprising:
converting the maximized distance of the vector product from the multiplication to a probability value indicating a likelihood that the input sample is in-distribution or out-of-distribution.

16. The method of claim 15, wherein the converting the maximized distance of the vector product further comprises computing a tangent value of the vector product when the distance of the vector product to the origin is maximized.

17. The method of claim 13, wherein the input sample is a training sample having a pre-defined classifier, and the method further comprises:
computing a loss based on the determination of whether the input sample is in-distribution or out-of-distribution and the pre-defined classifier; and
updating parameters associated with the penultimate layer of the neural network and the kernel vector of weights via backpropagation based on the loss.

18. A system for identifying out-of-distribution data samples using a neural network, the system comprising:
a communication interface that receives an input sample;
a memory containing machine readable medium storing machine executable code; and
one or more processors coupled to the memory and configurable to execute the machine executable code to cause the one or more processors to:
generate, at a penultimate layer of the neural network, a vector representation of the input sample;
retrieve a number of reference class vectors corresponding to a number of pre-defined classes;
compare the vector representation of the input sample against the number of reference class vectors; and
determine whether the input sample is in-distribution or out-of-distribution based on whether the vector representation of the input sample is orthogonal to the number of reference class vectors based on the comparison.

19. The system of claim 18, wherein the one or more processors are configurable to execute the machine executable code to cause the one or more processors to:
determine whether the input sample is in-distribution or out-of-distribution based on whether the vector representation of the input sample is within a threshold distance to an origin of a multi-dimensional space hosting the number of reference class vectors.

20. The system of claim 18, wherein the one or more processors are configurable to execute the machine executable code to cause the one or more processors to compare the vector representation of the input sample against the number of reference class vectors by:
multiplying a kernel vector of weights to the vector representation of the input sample from the penultimate layer;
computing a minimum angle made by the vector representation against one of the number of reference class vectors by maximizing a distance of a vector product from an origin; and
converting the maximized distance of the vector product from the multiplication to a probability value indicating a likelihood that the input sample is in-distribution or out-of-distribution.

* * * * *